(12) United States Patent
Howard

(10) Patent No.: US 10,270,292 B2
(45) Date of Patent: Apr. 23, 2019

(54) SYSTEM FOR WIRELESS DISTRIBUTION OF POWER

(71) Applicant: Keith Maxwell Howard, Norah Head (AU)

(72) Inventor: Keith Maxwell Howard, Norah Head (AU)

( * ) Notice: Subject to any disclaimer, the term of this patent is extended or adjusted under 35 U.S.C. 154(b) by 544 days.

(21) Appl. No.: 14/386,005

(22) PCT Filed: Jan. 3, 2013

(86) PCT No.: PCT/AU2013/000002
§ 371 (c)(1),
(2) Date: Sep. 18, 2014

(87) PCT Pub. No.: WO2013/102241
PCT Pub. Date: Jul. 11, 2013

(65) Prior Publication Data
US 2015/0042172 A1    Feb. 12, 2015

(30) Foreign Application Priority Data

Jan. 6, 2012   (AU) ................................ 2012900054
Mar. 19, 2012  (AU) ................................ 2012901088
Nov. 5, 2012   (AU) ................................ 2012904833

(51) Int. Cl.
| H01F 27/28 | (2006.01) |
| H01G 4/002 | (2006.01) |
| H02J 50/12 | (2016.01) |
| H01F 38/14 | (2006.01) |
| H02J 50/23 | (2016.01) |

(52) U.S. Cl.
CPC .............. *H02J 50/12* (2016.02); *H01F 27/28* (2013.01); *H01F 38/14* (2013.01); *H01G 4/002* (2013.01); *H02J 50/23* (2016.02)

(58) Field of Classification Search
USPC ........................................................ 307/104
See application file for complete search history.

(56) References Cited

U.S. PATENT DOCUMENTS

| 6,255,817 B1* | 7/2001 | Poitzsch .............. G01N 24/081 324/300 |
| 2009/0134711 A1 | 5/2009 | Issa et al. |
| 2011/0156494 A1* | 6/2011 | Mashinsky ............. H02J 17/00 307/104 |

* cited by examiner

*Primary Examiner* — Hal Kaplan
*Assistant Examiner* — Xuan Ly
(74) *Attorney, Agent, or Firm* — Mark M. Friedman

(57) ABSTRACT

A wireless power transmission system comprising a transmitting inverted Tesla Coil or Magnifier connected to the ground by its high voltage terminal using a capacitive earth connection and transmitting power through the ground to a subsequent receiving Tesla Coil or Magnifier being well earthed through a capacitive earth connection or conventional earth with the distance between the two earth connections of the transmitter and receiver plus the length of the coils in the transmitter and receiver forming a tuned length and the system thus composed being operated at a frequency that is an harmonic or close to an harmonic of the tuned length thus established.

25 Claims, 3 Drawing Sheets

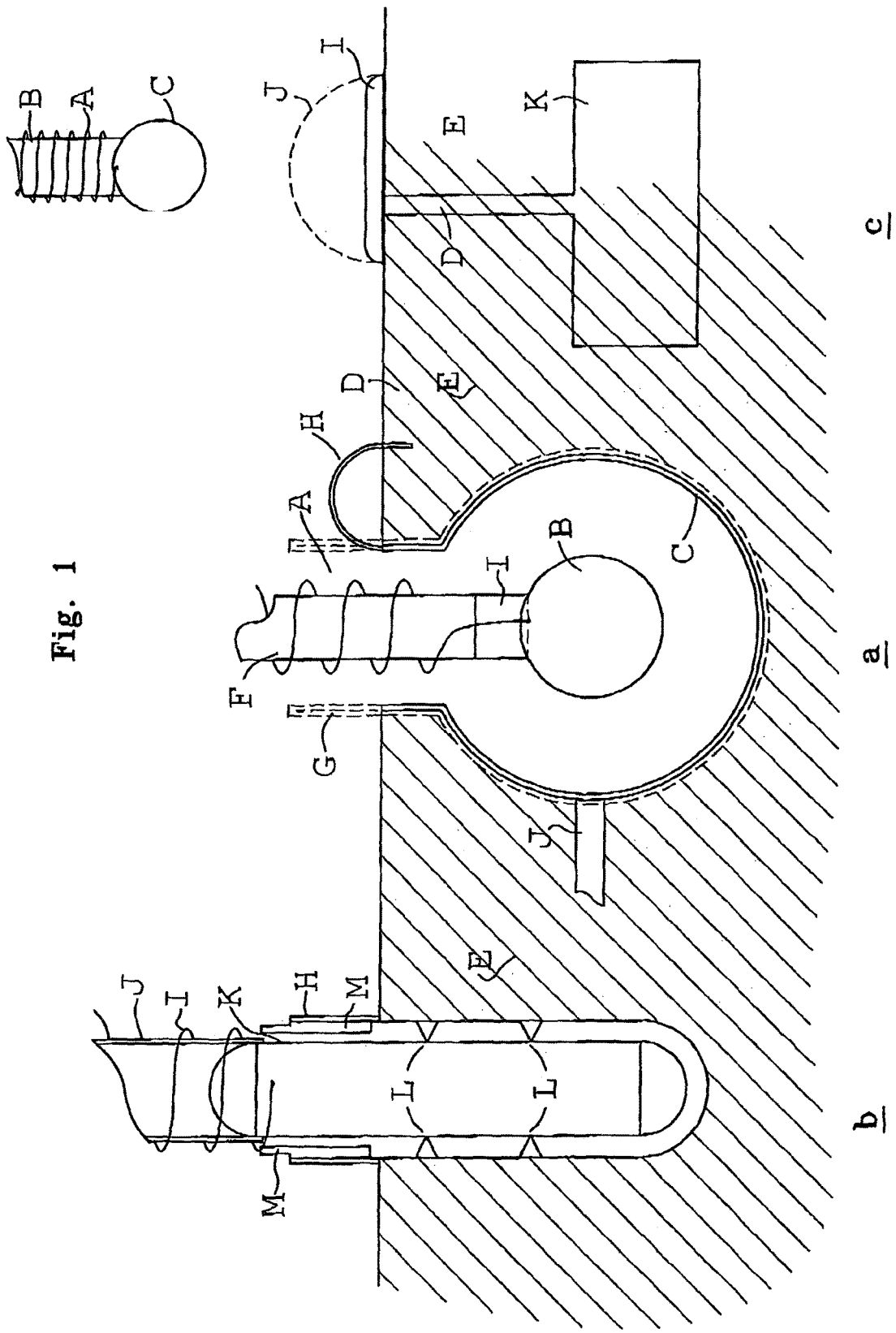

SYSTEM FOR WIRELESS DISTRIBUTION OF POWER

FIELD OF INVENTION

The present invention relates to a method of earthing oscillating electric coils through a capacitive connection to the earth so that AC earth currents will be developed when the capacitive connection is oscillated with AC electrical energy. When two or more oscillating coils are used as transmitters then electrical currents flow between the capacitive connections to the earth of the coils facilitating wireless power transmission through the earth. Receivers may then utilize the electrical current to take power from the earth. This is facilitated by a new coil operating paradigm.

BACKGROUND

Any discussion of the prior art throughout the specification should in no way be considered as an admission that such prior art is widely known or forms part of common general knowledge in the field.

Oscillating coils, particularly Tesla coils and Magnifiers have long since been used to produce high AC voltages and currents. A typical Tesla coil has an impedance of some 50,000 Ohms, however the earth impedance at certain frequencies may approach zero. This represents a very poor impedance match for the Tesla coil or any other oscillating coil that is trying to get decent power transfer to the earth since virtually all power is returned to the transmitter in the return phase due to lack of load resistance. It is important that the transmitter coil and the load must have the same impedance for the efficient transfer of power into the load in conductively connected apparatus, in this case, into the ground as a conduit between the transmitter and the load with the total impedance in the load plus ground impedance equalling the impedence in the transmitter coil. The result of this is that transmission of energy through the ground using these devices has been limited in range as the path of least resistance for the return current is to the coil itself. It is simply impossible to get power into the ground using grounded coils since at the point of power injection to the ground the voltage is virtually zero and since Power=VI very little power transfer takes place. Transmission is overcome by reverse currents forming as there is no voltage to speak of to drive the currents further though the ground. The current and voltage are also out of phase where these coils are traditionally earthed, at the bottom of the coil and this makes the power transfer even more difficult.

In the conventional connection, the coil is connected to the earth at one end so the impedance in the coil capacitor pair would normally have to be matched for transmission to take place efficiently the same as applies to radio which is impossible with existing coil design since for efficient transfer the impedance of the load should equal the impedance of the transmitter thus if we have an impedance of zero we can get no power into the transmitter when the apparatus is operated using the current paradigm.

It would be a great advance in this area of endeavour if a suitable earthing system could be devised for Tesla coils or Magnifiers in particular, but also oscillating coils in LC or LCR systems in general to allow the energy transfer of the current and voltage transmitted between two or more locations on the earth to be efficient and in phase.

Nikola Tesla in his U.S. Pat. No. 645,576 issued 20 Mar. 1900 disclosed a system and method for transmitting electrical energy through a natural media. In particular forms, the propagation of electrical energy is by conduction through air strata however the disclosure of this patent contemplates adjustment of at least frequency and voltage with a view to adjusting the extent to which electrical energy is passed through the air or through the earth. The specification and drawings of U.S. Pat. No. 645,576 are incorporated herein in their entirety by cross reference.

Broadly, the Tesla system comprised a step up transformer arrangement in electrical communication with an earth terminal and an 'elevated' terminal. When referenced in later art—for example see U.S. Pat. No. 7,960,867 issued 14 Jun. 2011 to Issa et al, this arrangement is collectively termed the emitter. The step up coil arrangement is also termed a Tesla coil or a Tesla resonator. The emitter transmits electrical energy wirelessly through media including earth and earth's atmosphere to a receiver which comprises a second Tesla resonator or step down arrangement in communication with an earth terminal and an 'elevated' terminal.

Attempts continue to this day to transfer efficiently substantial amounts of electrical energy wirelessly broadly in accordance with this mechanism.

In that regard, for example, U.S. Pat. No. 7,960,867 referred to above, issued to Issa et al discloses a particular arrangement for a transmitter and emitter. The entire disclosure of U.S. Pat. No. 7,960,867 is incorporated herein by cross reference and including the prior art references referred to therein.

An unverified report from AFP (Agence France-Presse) dated in 2008 indicates that Intel powered a 60 Watt light bulb utilising a wireless energy resonant link reliant primarily on magnetic field leakage rather than electric field leakage. This approach using substantially entirely induction has severe transmission distance limitations.

It is an object of the embodiments of the present invention to provide a system for wireless distribution of power which addresses or ameliorates one or more of the above mentioned disadvantages.

Notes

The term "comprising" (and grammatical variations thereof) is used in this specification in the inclusive sense of "having" or "including", and not in the exclusive sense of "consisting only of".

The above discussion of the prior art in the Background of the invention, is not an admission that any information discussed therein is citable prior art or part of the common general knowledge of persons skilled in the art in any country.

SUMMARY OF THE INVENTION

Accordingly it is the object of the present invention to provide an earthing method that allows oscillating coils to connect to the earth in a way that maximizes their power input to the ground to allow better efficiency in power transfer and allow power transmission to be conducted economically through the earth without wires. This is facilitated by a new coil operating paradigm.

In a broad form of the invention there is provided, a wireless power transmission system comprising: a transmitting inverted Tesla Coil or Magnifier connected to the ground by its high voltage terminal using a capacitive earth connection and transmitting power through the ground to a subsequent receiving Tesla Coil or Magnifier being well earthed through a capacitive earth connection or conventional earth with preferably the distance between the two earth connections of the transmitter and receiver plus the length of the coils in the transmitter and receiver forming a tuned length and the system thus composed being operated at a frequency that is an harmonic or close to an harmonic of the tuned length thus established. (In practice any length may be used, however efficiency may be impaired unless the tuned length is utilised.)

Preferably inverted Tesla coil or Magnifier has a large capacitance on an elevated terminal which becomes a high current, low-voltage node and is used as the neutral side during power transmission.

Preferably coils are caused to impress voltage through their high voltage terminal onto the ground through air separation or using any of the capacitive earthing devices mentioned in the text or shown in the drawings hereto or any other efficacious capacitive connection method.

Preferably the transmitting inverted Tesla Coil or Magnifier is brought into resonance with a second receiving Tesla Coil or Magnifier to maximize the amount of energy available in the receiving Tesla Coil or Magnifier.

Preferably additional Tesla Coils or Magnifiers are added for transmission and reception of power by having each of them being located in a triangular (or other) grid pattern so that the transmitters and receivers that are within range of each other all use the same frequency or a harmonic of each others frequency augmenting the action of the other transmitters and receivers.

Preferably longer distance transmission is achieved by using lower frequencies.

Preferably shorter distance transmission is achieved by using higher frequencies.

Preferably frequencies used for longer or shorter distances are an harmonic of one another.

In yet another broad form of the invention there is provided a system where the method of single conductor power transmission is used to develop AC current and subsequently transmit the power through the earth to a receiver so that the energy at the receiver is rendered useable.

In another broad form of the invention there is provided a system where an oscillating LCR or LC circuit of any description is used to develop AC current which is transmitted through the earth to a receiver using an LCR or LC circuit of any description as a single, conductor power transfer system with which to transmit power wirelessly from one location to another using the earth as a single conductor to do so.

Preferably LCR or LC circuit of the transmitter and the LCR or LC circuit of the receiver is brought into resonance with each other.

Preferably more than one power transmission and reception system may operate contemporaneously with another power transmission and reception system and not interfere with one another as each system is built to operate at a different discrete frequency so that neither power transmission system interferes with the operation of the other allowing discrete power generation and transmission to occur to allow commercial competition.

Preferably power transmission on discrete frequencies is allocated to transmission and receiving power stations so that civilian power may run on one frequency and the defence forces may run on another frequency so that in the event that the civilian power grid goes down, the defence power grid still remains intact.

In yet another broad form of the invention there is provided, a wireless power transmission system comprising: a transmitter coil connected to the ground by its high voltage terminal using a capacitive earth connection and transmitting power through the ground to a subsequent receiving coil; the subsequent receiving coil being well earthed through a capacitive earth connection or conventional earth.

Preferably the distance between the earth connection of the transmitter coil and the earth connection of the receiving coil plus the length of the coils in the transmitter and receiver forming a tuned length and the system thus composed being operated at a frequency that is an harmonic or close to an harmonic of the tuned length thus established.

Preferably the transmitter coil has a large capacitance on an elevated terminal which becomes a high current low-voltage node and is used as the neutral side during power transmission.

Preferably the coils are caused to impress voltage through their high voltage terminal onto the ground.

Preferably the transmitting coil is brought into resonance with the receiving coil to maximize the amount of energy available in the receiving coil.

Preferably further including at least one additional coil for transmission and reception of power wherein the at least one additional coil is located in a triangular grid pattern so that the transmitter coil and receiver coil that are within range of each other all use the same frequency or a harmonic of each others frequency augmenting the action of the other transmitters and receivers.

Preferably longer distance transmission is achieved by using lower frequencies.

Preferably shorter distance transmission is achieved by using higher frequencies.

Preferably the frequencies used for longer distances are an harmonic of one another and of the shorter distance frequencies.

Preferably the frequencies used for shorter distances are an harmonic of one another and of the longer distance frequencies.

In yet another broad for of the invention there is provided a wireless power transmission system wherein single conductor power transmission is used to develop AC current and subsequently transmit power through the earth to a receiver so that the energy at the receiver is rendered useable.

Preferably the oscillating LCR or LC circuit of the transmitter and the LCR or LC circuit of the receiver is brought into resonance with each other.

In a further broad form of the invention there is provided a wireless power transmission system wherein an oscillating LCR or LC circuit is used to develop AC current which is transmitted through the earth to a receiver using an LCR or LC circuit as a single conductor power transfer system with which to transmit power wirelessly from one location to another using the earth as a single conductor to do so.

Preferably further including at least one capacitive connection associated with an earth connection.

Preferably the oscillating LCR or LC circuit of the transmitter and the LCR or LC circuit of the receiver is brought into resonance with each other.

Preferably more than one power transmission and reception system may operate contemporaneously with another power transmission and reception system and not interfere with one another as each system is built to operate at a different discrete frequency so that neither power transmission system interferes with the operation of the other allowing discrete power generation and transmission to occur to allow commercial competition.

Preferably power transmission on discrete frequencies is allocated to transmission and receiving power stations so that civilian power may run on one frequency and the defence forces may run on another frequency so that in the event that the civilian power grid goes down, the defence power grid still remains in tact.

Preferably once the carrier wave is established in the earth between two points, the wave can then be overlaid with data signals using frequencies that are higher or lower harmonics of the carrier frequency or other frequencies, whereby the system may be used for Data, signal, voice Transmission as well as power transmission.

In a preferred form of the system, once a carrier wave is established in the earth between two points, the wave is then overlaid or varied to induce data signals for transmission thereover.

Preferably the wave is overlaid using any method of Frequency Modulation, Frequency Shift Keying, Encoding or any other technology currently extant whereby the system may be used for Data, signal, voice Transmission as well as power transmission.

Preferably the carrier wave is established in the earth between points then the frequency may be varied using a pre-programmed input.

Preferably the pre-programmed input frequently shifts the frequency of transmission thereby making it very difficult to tune into the system with a receiver, unless one has access to the pre-programmed transmission frequency input sequence so that the next frequency shift can be anticipated and tuned synchronously with the tuning shift in the transmitter.

In yet another broad form of the invention there is provided a method of forming a tuned network from at least one first coil assembly and an at least one second coil assembly; the method comprising: connecting a capacitor between the at least one first coil assembly and earth, and the at least one second coil assembly and earth, such that a tuned path is formed through the earth between the at least one first coil assembly and the at least one second coil assembly, when at least one of the at least one first coil assembly or second coil assembly is excited at a predetermined frequency.

Preferably the capacitor is formed from a first metal plate and at least a second metal plate.

Preferably the first metal plate is formed as a substantially closed volume.

Preferably the substantially closed volume is a sphere.

Preferably the first metal plate is substantially enclosed by the second metal plate.

Preferably the second plate is located within the earth.

Preferably the first plate is located at or near an earth/air interface.

In yet another broad form of the invention there is provided a method of earthing oscillating coils through a capacitive connection to the earth so that AC earth electrical currents will be developed when the capacitive connection is excited with AC electrical energy.

Preferably a plurality of oscillating coils is used as transmitters, then electrical currents flow between the connections facilitating wireless power transmission through the ground.

In a further broad form of the invention there is provided a method of maximizing potential between a first coil connected capacitively to a first earth terminal and a second coil connected capacitively to a second earth terminal; the first earth terminal spaced from the second earth terminal; the method including the step of: exciting at least the first coil at a predetermined frequency which maximizes the voltage difference between at least a portion of the first coil and at least a portion of the second coil.

Preferably once a carrier wave is established in the earth between two points, the wave is then overlaid with data signals using frequencies that are higher or lower harmonics of the carrier frequency (or other frequencies) whereby the system may be used for Data, signal, voice Transmission as well as power transmission.

Preferably the carrier wave is established in the earth between two points, the wave is then overlaid or varied to induce data signals for transmission thereover.

Preferably the wave is overlaid using any method of Frequency Modulation, Frequency Shift Keying, Encoding or any other technology currently extant whereby the system may be used for Data, signal, voice Transmission as well as power transmission.

Preferably the carrier wave is established in the earth between points then the frequency may be varied using a pre-programmed input.

Preferably the pre-programmed input frequently shifts the frequency of transmission thereby making it very difficult to tune into the system with a receiver, unless one has access to the pre-programmed transmission frequency input sequence so that the next frequency shift can be anticipated and tuned synchronously with the tuning shift in the transmitter.

This process secures the system from having energy stolen from the transmission by electricity thieves.

BRIEF DESCRIPTION OF DRAWINGS

Embodiments of the present invention will now be described with reference to the accompanying drawings wherein:

FIG. 1a illustrates a typical earthing system as referred to in this document;

FIG. 1b illustrates a variable capacitor to allow earthing as described in this document;

FIG. 1c shows another method of connecting an oscillating coil to the earth capacitively;

FIG. 2 illustrates a Tesla Magnifier impressing voltage pressure to the earth through the apparatus in FIG. 1a;

DESCRIPTION OF EMBODIMENTS

Figure 3:
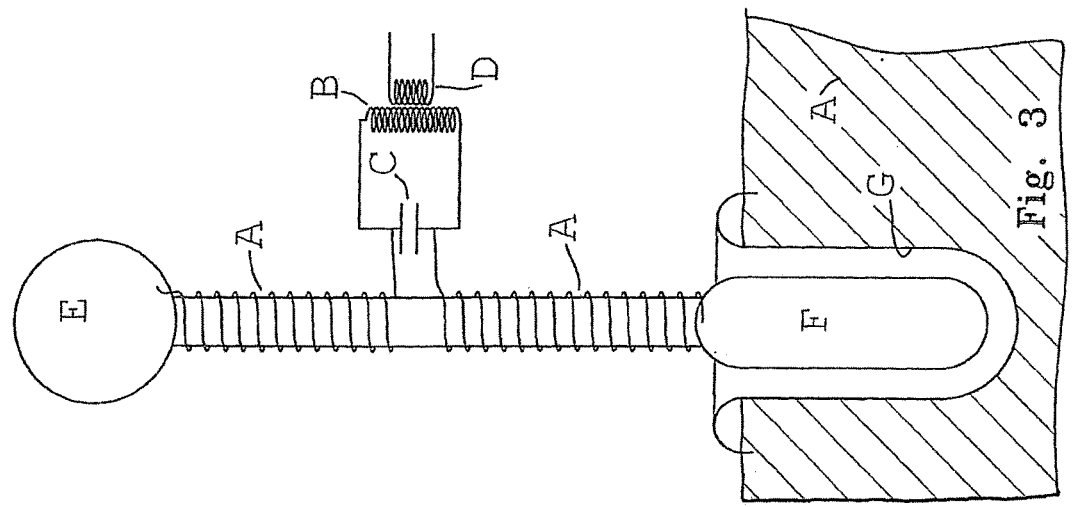
FIG. 3 illustrates a half wave AC solenoid coil applying voltage pressure to the earth using the capacitive earth connection in FIG. 1b.

This specification builds on the inventor's earlier filed Australian provisional patent application no 2012900054 filed 6 Jan. 2012 the disclosure of which including description, claims and drawings is incorporated herein by cross reference.

The preferred embodiment provides a means to connect to the earth with oscillating coils so that power transfer may take place between the earth and the power transmitter. An oscillating coil being a Tesla coil or magnifier or any other coil is set in motion using a generator or a DC pulse width driver or any other apparatus which causes the coil to gain frequency and also voltage. The highest voltage end is connected to a sphere or other suitable shaped object such as an ellipsoid which is placed inside a cavity which has been created in the ground and lined with conductive material with a good earth established with this lining. Both sides of the capacitor thus constructed should be made of an electrically conductive material. The cavity may be constructed deeper in the earth and connected to the top through a cylindrical hole lined with either conductive material or an insulator, depending on how much capacitance is required and the voltages used. The cavity's conductive lining may be connected to earthing radials made of suitably conductive material to increase the conductivity between the cavity lining and the earth.

The apparatus thus described is one method only in connecting in this manner. The device is designed to provide a capacitive connection to the earth of a high voltage oscillating source using the capacitance to offset the impedance in the earth. The object of the design is to simply connect the sphere connected to the coil operating the high voltage end of the Tesla coil or other coil to the earth using capacitance so that the impedance of the earth is matched to allow currents to be established in the earth from the high voltage portion of the oscillating circuit. The currents created by a capacitor of this design tend to promote closer in phase voltage and current in the near field of the capacitive connection.

It has been well established that there is small ground impedance for frequencies up to around 20 kHz and it can then increase with increased frequency. The design of the capacitor thus established is then sized to operate at the required frequency of operation so that the capacitive reactance offsets the ground impedance for the required frequency. For example if we build a capacitor that is buried with the outside sphere of the capacitor connected to the earth and on the inside we place another sphere creating an air gap between the two spheres and it has a capacitance of say 159 nF then the capacitive reactance at that frequency is ½×pi×C×F and we wish to operate it at 20 kHz the capacitive reactance is just over 50 Ohms. If the earthing impedance when tested at this point is also 50 Ohms then we have an almost exact match so that the capacitive connection offsets the impedance in the earth allowing current to flow from the earth connected side of the capacitor more efficiently. If the earth impedance once tested at a particular location is known then the capacitor should be sized using the frequency required to offset the impedance of the earth at that frequency. The capacitance requirement of the coil connected to this capacitor must also be taken into account in the usual manner.

The connection is used to facilitate better ground based power transfer through the earth using oscillating currents induced in the earth using high voltage.

The cavity in the ground can be any shape with volume as can the inner side of the capacitor and may also be a sheet of conductive material on the surface of the ground which is well grounded. There will be less breakout occurring between the two sides of the capacitor if they are both symmetrical with smooth curved surfaces.

The capacitive connection thus established between the earth and the coil will allow much more efficient transfer of energy from the coil to the earth. The better the earthing of the earth side of the capacitor to the earth then the greater the amount of power transfer may be conducted with fewer losses.

Two transmitters each independently electrically powered by a local source are then set up using this capacitive connection to the earth at a distance from one another so that the straight line distance between the transmitters is preferably an odd multiple of a half wavelength of the frequency being used to transmit. This means that when one polarity of the voltage impressed into the earth by one transmitter is positive, the voltage in the other transmitter is negative and vice versa. In this way currents are forced through the ground backwards and forwards between the high and low voltage points establishing an AC current in the ground between the two transmitters. Both transmitters are brought into resonance and power may be taken from any point in between the two transmitters by a conventionally earthed Tesla coil or other suitable resonator known to those skilled in the art. An even multiple of a half wavelength distance may also be used between transmitters which would mean both transmitters impress voltage onto the ground in the same sense at the same time. Any other distance which enhances the transmission of power, with each subsequent transmitter being tuned to be synchronous with the AC signal in the ground being transmitted by the first transmitter may also be used, such as a distance of a three quarter wave with the second transmitter suitably out of phase with the first transmitter etc. Transmission may take place also when just using a single transmitter and in this case the transmission will be more omnidirectional. Many transmitters may be used at once and when this is the case care should be taken to ensure that the location of each transmitter is compatible with transmitters within range of each other to ensure their activity is such that they each augment the others electrical activity rather than retarding it.

Referring to FIG. 1a is a sketch of one method of designing a capacitive connection to the earth of an AC coil. A is a coil coming from an oscillating electrical circuit which is connected to B which is a sphere made of conductive material. C is another sphere which is buried in the ground and connected conductively to the earth E with a cylindrical top extending to the surface of the earth D. F is a former onto which coil A is wound and G is a dielectric insulator which may be used to insulate C from connection to the earth if this is considered appropriate. A further metal skin may also be added to the outside of G for connection directly to earth. C may be connected to earthing radials J which may be many or few and extend from C in the same fashion as spokes extend from the centre of a wheel. H is a method of reducing breakout between the two sides of the capacitor since the rounded form will impede this activity. I is a polished metal cylinder that may be designed in length so that the coil can be raised out of the earth if the voltage is too high so that only the polished metal surface acts against the earthed side of the capacitor. This will allow more voltage to be used by the sphere before breakout occurs.

When sphere B is brought to a high voltage in a positive sense it propels electrons from the embedded sphere C into the earth. On the return cycle when B becomes negative then the electrons are then attracted to C. Thus an alternating field is set up in the earth in the vicinity of this high voltage oscillation.

The impedance of the connection of the capacitor may be designed in such a way to offset and inductance in coil A and provide the correct capacitive reaction to offset the ground impedance (if any) encountered in causing electric currents to arise in the earth. The setup may be placed further into the earth simply by extending the connecting cylinder at the top of sphere C and the metal cylinder I. I may be slotted to reduced currents forming in the cylinder in the vicinity of its join to the coil A.

Referring to FIG. 1b is a capacitor that may be varied in capacitance by inserting the centre portion of the capacitor K (a cylinder with spherical end caps) into the ground by lowering it into a hole lined with a cylinder H made of conductive material. Cylinder H may also have the curved surface at the top as shown in FIG. 1a-H. The capacitor is connected to coil I and coil former J which is raised and lowered by a lifting device which is not shown. The further into the cylinder H cylinder K is inserted then the more capacitance is achieved. Guides L are insulation formers which guide the centre cylinder K to ensure the distance between the two cylinders remains constant.

When high AC voltage is generated in cylinder K then an AC energy disturbance appears in the earth surrounding cylinder H. Insulator M may be inserted in the top of the cylinder H to avoid flashover from coil I. For larger voltages the size of the hole and the insulator may be increased. Insulator M may be contrived so that it extends to further cover the coil.

Referring to FIG. 1c illustrates another earthing method where a flat plate I or rounded surface plate J may be used to connect sphere C which is operated by AC from coil A wound on coil former B. Rod D connects the plate I or J to the ground E through high surface area grounding plate K. Electrical currents are produced in the earth due to the capacitive connection between sphere C and plates I or J when. AC voltage is used in sphere C.

Figure 2:
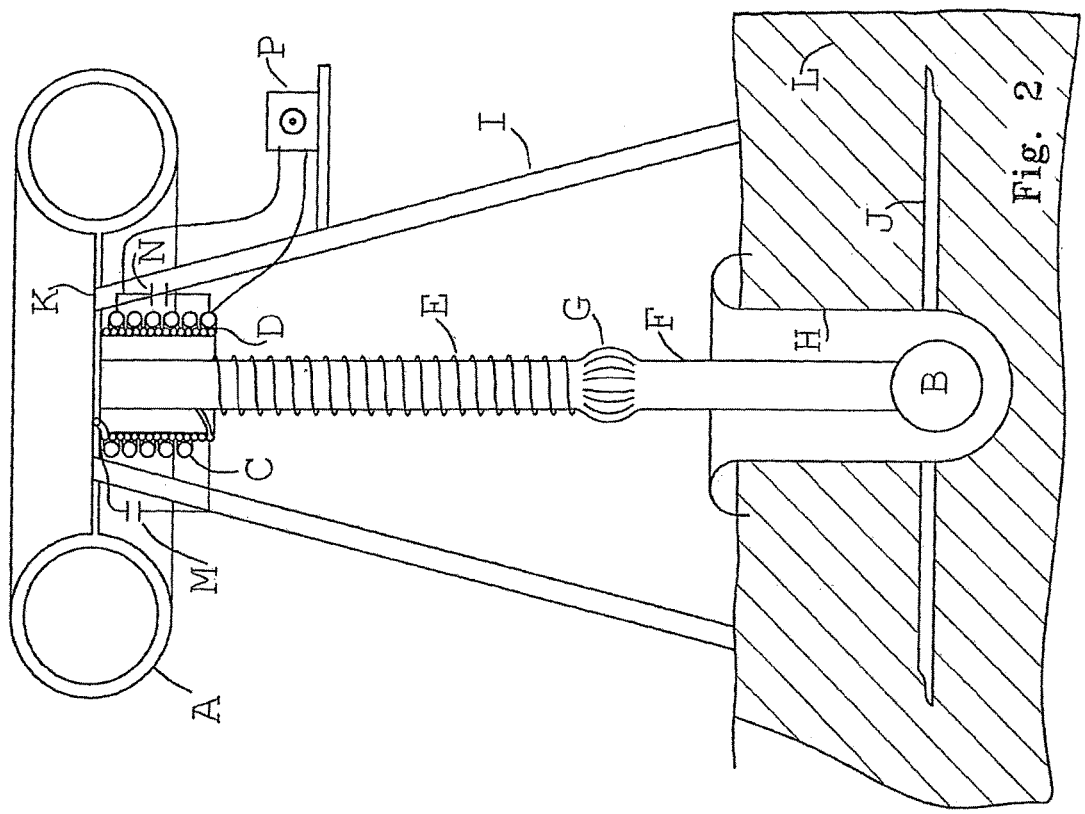

Referring to FIG. 2 shows a Tesla Magnifier designed in such away so that the top capacitor toroid A is the low voltage side of the coil set up and the high voltage side capacitor is B. This is inverted compared to a normal Tesla Magnifier as this one has the primary coil C at the top and secondary coil D also at the top. Tertiary coil E extends into the secondary coil D slightly but is still allowed to resonate either freely or at a forced higher harmonic if its actual tuning is lower than the operational frequency of the apparatus which can be achieved using a higher K connection to secondary coil C. F is a polished metal cylinder which joins coil E to capacitor B and has a slotted covering connection to the coil at G to stop breakout. The interaction between cylinder F and sphere B collectively with grounded cylinder (with spherical end) H is capacitive. When F and B are brought to high voltage then a field in the opposite sense may be set up in cylinder H suppressing breakout from cylinder F of sphere B to H. If very high voltages are to be used then radials J may be disconnected from H and an insulator may be placed between H and the earth L to enhance the voltage polarity reversal between H and B (as shown in FIG. 1a at G). Radials J may be used to enhance the earthing of cylinder H. I is a support beam constructed from a suitable material to act as an insulator to keep toroid. A electrically insulated from the ground and with which to support toroid A at the lower voltage point on the toroid which is a metal plate K which is also connected to the end of the secondary coil D. Capacitor M is used to tune the secondary coil C to run at the same frequency as the resonating coil E. Capacitor N may be used as a shunt on the primary coil C if considered necessary. Generator P is kept separate from the ground and not earthed to the ground L, but may be earthed to metal plate K along with the secondary and primary coils D and C. Just treat the toroid capacitor as if it was the earth in your connections. The relationship between the voltage in toroid capacitor A and sphere capacitor B is as normal such that C1V1=C2V2. Thus the high capacitance runs at low voltage and the low capacitance runs a high voltage.

In operation the large toroid capacitor may be sized in such a way that it is a sub-harmonic of the operating frequency and then forced through a high K connection between coils D and C to run at a higher operating frequency. This means the toroid has swamped the coil system at this end and makes it capacitive and therefore a current node. It effectively makes an earth in the air. The high voltage node then appears at the other end of the coil system in capacitor sphere B. During operation capacitor B is excited with high voltage AC electricity which induces currents into the earth L surrounding the earth connection H and J. The higher the voltage attained in B then the further the effect of the currents in the earth may be detected.

To characterize the transmission system in normal terms: we have the earth replaced by the toroid at the top of the structure which now becomes the neutral side of the AC circuit. The active side of the circuit is now the earth or ground and since we now have an active and a neutral; current flows from one capacitive connection of the active high voltage transmitter to the other transmitter connected by capacitance to the active with its own separate neutral (toroid). Compared to SWER transmission systems in which the power line is the active with the earth the neutral, we now have the exact opposite. The earth neutral is replaced by the toroid on both transmitters. The active is now the ground itself. The receiver may connect to the earth either by capacitance or through a direct connection in the normal manner.

If the sum of the lengths of the secondary and tertiary coils is a full wave length of the operating frequency then capacitor side H will be the same polarity as toroid A which may enhance the distance the electrical energy is transmitted through the ground.

If the large capacitive surface A was a sphere instead of a toroid and it is of sufficient size, a horizontal platform may be constructed inside the sphere made of insulating material and a spiral coil design used so that the primary and secondary coil would operate in this space. The outside loops of the primary and secondary coils would then each earth to the sphere. The tertiary coil may then be attached to the high voltage end of the secondary coil and extend through a suitably shaped hole in the bottom of the sphere ensuring at all times that there is sufficient distance between the high voltage end of the tertiary coil and the sphere to avoid electrical breakout. In this case cylinder F may be extended in length to join to the end of the tertiary coil E in the normal manner. The shape of the sphere may be the same as used on the Tesla Magnifier built at Wardenclyffe, or any other design which would suit the purpose.

Referring to FIG. 3 shows two quarter wave coils A operated by secondary coil B and joined to each end of capacitor C. The coils are energized by primary coil D in the usual way which is operated by a primary coil in the usual way. E is a sphere used as a capacitor and F is an ellipsoid used in the fashion as described in FIG. 1b. Using AC power input the coils are brought to high voltage through resonance. In this set up the capacitors at E and F should be tuned to allow maximum voltage activity to appear in coils A in the usual way. The ellipsoid F is inserted into grounding half ellipsoid structure G to vary the capacitance and provide capacitive connection to the earth H. The earth connection H is impressed with high voltage which sets up oscillating AC currents in the earth.

Figure 4:
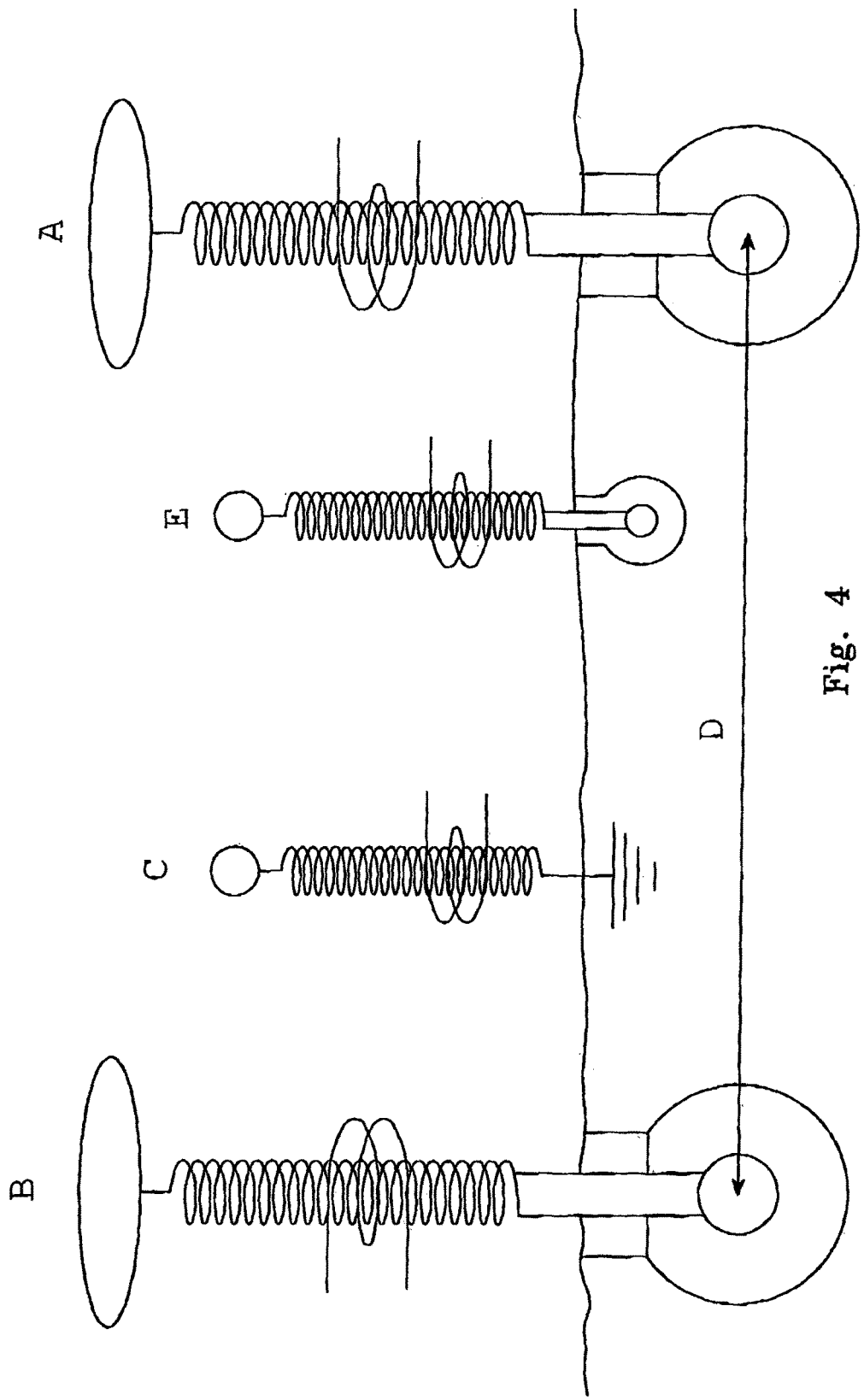
FIG. 4 is a resonantly coupled transmitter pair connected to the earth using capacitive earth connections. Two Tesla coils, one conductively connected to earth and one connected to the earth using capacitance are shown in between the two transmitters utilizing currents established in the ground between the two transmitters.

Referring to FIG. 4 shows two transmitters A and B based on the design of the transmitter in FIG. 2 connected to the ground using the capacitive connection method described in FIG. 1a. Ideally, the distance separating the two transmitters is D which is an odd multiple of a half wavelength of the frequency being used. This means that when transmitter A is showing a positive charge in the earth then B is showing a negative charge in the earth. This induces currents to flow between the earths of both transmitters. Two power receiving Tesla coils or resonators C and E with power take off circuits are connected to the ground in between the two transmitter coils, one conductively in the traditional manner and the other using capacitance as per the design in FIG. 1a. When both transmitters A and B are operated so that they operate synchronously in resonance with one another then currents will flow though the earth between the two capacitive earth connections enabling power to be taken from the earth with Tesla coils C or E. Power may also be able to be taken from either transmitter omni-directionally independently in smaller amounts, but the main electrical activity in the ground will occur between the two transmitters. It is obvious that more than two transmitters and receivers may be used as long as they are in a resonantly harmonious relationship to each other in regards to their separation distance from one another and frequency at which they operate. If a transmitter if very high power were to be constructed in this manner then power would be available omnidirectionally with significant power available in any direction.

When the transmitter is operated at low frequency say around or below 20 kHz then large departures can be made from the ideal separation distance between the two transmitters due to the long wavelength which is 15 km. It is best however to determine the two locations for the transmitters and design them around a convenient frequency of the intervening distance for maximum performance.

Further variations within the scope of the invention contemplated. For example:

In one form the carrier wave is established in the earth between two points and the wave is then overlaid or varied to induce data signals for transmission thereover.

Preferably the wave is overlaid using any method of Frequency Modulation, Frequency Shift Keying, Encoding or any other technology currently extant whereby the system may be used for Data, signal, voice Transmission as well as power transmission.

Preferably the carrier wave is established in the earth between points then the frequency may be varied using a pre-programmed input.

Preferably the pre-programmed input frequently shifts the frequency of transmission thereby making it very difficult to tune into the system with a receiver, unless one has access to the pre-programmed transmission frequency input sequence so that the next frequency shift can be anticipated and tuned synchronously with the tuning shift in the transmitter.

This process secures the system from having energy stolen from the transmission by electricity thieves.

Reference throughout this specification to "one embodiment" or "an embodiment" means that a particular feature, structure or characteristic described in connection with the embodiment is included in at least one embodiment of the present invention. Thus, appearances of the phrases "in one embodiment" or "in an embodiment" in various places throughout this specification are not necessarily all referring to the same embodiment, but may. Furthermore, the particular features, structures or characteristics may be combined in any suitable manner, as would be apparent to one of ordinary skill in the art from this disclosure, in one or more embodiments.

Similarly it should be appreciated that in the above description of exemplary embodiments of the invention, various features of the invention are sometimes grouped together in a single embodiment, Fig., or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the Detailed Description are hereby expressly incorporated into this Detailed Description, with each claim standing on its own as a separate embodiment of this invention.

Furthermore, while some embodiments described herein include some but not other features included in other embodiments, combinations of features of different embodiments are meant to be within the scope of the invention, and than different embodiments, as would be understood by those in the art. For example, in the following claims, any of the claimed embodiments can be used in any combination.

In the description provided herein, numerous specific details are set forth. However, it is understood that embodiments of the invention may be practiced without these specific details. In other instances, well-known methods, structures and techniques have not been shown in detail in order not to obscure an understanding of this description.

As used herein, unless otherwise specified the use of the ordinal adjectives "first", "second", "third", etc., to describe a common object, merely indicate that different instances of like objects are being referred to, and are not intended to imply that the objects so described must be in a given sequence, either temporally, spatially, in ranking, or in any other manner.

Capacitive earth connection means any connection to earth using any of the two sided capacitors sketched in the drawing attached or any apparatus that uses similar principles of connection to gain a connection through capacitance to the ground. A capacitive earth connection therefore doesn't imply that the high voltage part of the capacitor comes into direct contact with the earth.

Operating frequency means the frequency at which the apparatus is designed to be operated.

Inverted Tesla coil or Magnifier means any Tesla Coil or Magnifier using the principle of putting a high voltage sphere or terminal close to the ground to induce current in the ground.

Tesla coil or Magnifier means Tesla coil or Magnifier and may also mean inverted Tesla Coil or Magnifier if the sense of the description demands it.

In the claims below and the description herein, any one of the terms comprising, comprised of or which comprises is an open term that means including at least the elements/features that follow, but not excluding others. Thus, the term comprising, when used in the claims, should not be interpreted as being limitative to the means or elements or steps listed thereafter. For example, the scope of the expression a device comprising A and B should not be limited to devices consisting only of elements A and B. Any one of the terms including or which includes or that includes as used herein is also an open term that also means including at least the elements/features that follow the term, but not excluding others. Thus, including is synonymous with and means comprising.

Similarly, it is to be noticed that the term coupled, when used in the claims, should not be interpreted as being limitative to direct connections only. The terms "coupled" and "connected," along with their derivatives, may be used. It should be understood that these terms are not intended as synonyms for each other. Thus, the scope of the expression a device A coupled to a device B should not be limited to devices or systems wherein an output of device A is directly connected to an input of device B. It means that there exists a path between an output of A and an input of B which may be a path including other devices or means. "Coupled" may mean that two or more elements are either in direct physical or electrical contact, or that two or more elements are not in direct contact with each other but yet still co-operate or interact with each other.

Although the present invention has been described with particular reference to certain preferred embodiments thereof, variations and modifications of the present invention can be effected within the spirit and scope of the following claims.

The invention claimed is:

1. An AC power transmission system comprising:
a transmitting coil connected to the ground using a capacitive earth connection buried in the ground located between the coil and the ground and transmitting power through the ground through the capacitive connection to a subsequent receiving coil which is well earthed through a capacitive earth connection buried in the ground or conventional earth connection with the distance between the two earth connections of the transmitter and receiver plus the length of the coils in the transmitter and receiver forming a tuned length and the system thus composed being operated at a frequency having a wavelength that is an harmonic or close to an harmonic of the tuned length thus established.

2. A system as claimed in claim 1 where the transmitting coil has a large capacitance on an elevated terminal and is used as the neutral side during power transmission.

3. A system as claimed in claim 1 where the transmitting coil is caused to impress voltage into the ground through buried capacitive earthing devices.

4. A system as claimed in claim 1 where the transmitting coil is brought into resonance with the second receiving coil to maximize the amount of energy available in the receiving coil.

5. A system as claimed in claim 4 where additional coils are added for transmission and reception of power by having each of them being located in a triangular grid pattern so that the transmitters and receivers that are within range of each other all use the same frequency or a harmonic of each other's frequency augmenting the action of the other transmitters and receivers.

6. The system as claimed in claim 1, wherein the capacitor is formed from a first metal plate and at least a second metal plate.

7. The system of claim 6, wherein the first metal plate is formed as a substantially closed volume.

8. The system of claim 7, wherein the substantially closed volume is a sphere.

9. The system of claim 6 wherein the first metal plate is substantially enclosed by the second metal plate.

10. The system of claim 6 wherein the first and second plate is are located within the earth.

11. The system of claim 6 wherein the first plate is located at or near an earth/air interface.

12. The system of claim 1 wherein the capacitive earth connection is buried substantially in the earth.

13. The system of claim 1 wherein the capacitive earth connection is buried entirely in the earth.

14. A method of transmitting AC power through the earth between at least one first coil assembly and an at least one second coil assembly; said method including forming a tuned network from said at least one first coil assembly and said at least one second coil assembly; the method further comprising:
connecting a substantially capacitor between the at least one first coil assembly and earth;
connecting the at least one second coil assembly and earth ; such that a tuned path is formed through the earth between the at least one first coil assembly and the at least one second coil assembly when the at least one first coil assembly is excited at a predetermined frequency; whereby AC power is transmitted through the capacitor and through the earth from the at least one first coil assembly to the at least one second coil assembly.

15. The method as claimed in claim 14 where the transmitting coil has a large capacitance on an elevated terminal and is used as the neutral side during power transmission.

16. The method as claimed in claim 14 where the transmitting coil is caused to impress voltage into the ground through buried capacitive earthing devices.

17. The method as claimed in claim 14 where the transmitting coil is brought into resonance with the second receiving Coil to maximize the amount of energy available in the receiving coil.

18. The method as claimed in claim 17 where additional coils are added for transmission and reception of power by having each of them being located in a triangular grid pattern so that the transmitters and receivers that are within range of each other all use the same frequency or a harmonic of each other's frequency augmenting the action of the other transmitters and receivers.

19. The method of claim 14, wherein the buried capacitor is formed from a first metal plate and at least a second metal plate.

20. The method of claim 19, wherein the first metal plate is formed as a substantially closed volume.

21. The method of claim 20, wherein the substantially closed volume is a sphere.

22. The method of claim 19 wherein the first metal plate is substantially enclosed by the second metal plate.

23. The method of claim 19 wherein the first and second plate are located within the earth.

24. The method of claim 14 wherein the capacitive earth connection is buried substantially in the earth.

25. The method claim 14 wherein the capacitive earth connection is buried entirely in the earth.

* * * * *